United States Patent
Herrmann et al.

(10) Patent No.: US 11,059,422 B2
(45) Date of Patent: Jul. 13, 2021

(54) REAR VIEW DEVICE AND MOTOR VEHICLE

(71) Applicant: SMR Patents S.à.r.l, Luxembourg (LU)

(72) Inventors: Andreas Herrmann, Stuttgart (DE); Graham Rehill, Portchester (GB)

(73) Assignee: SMR Patents S.à.r.l., Luxembourg (LU)

( * ) Notice: Subject to any disclaimer, the term of this patent is extended or adjusted under 35 U.S.C. 154(b) by 216 days.

(21) Appl. No.: 16/178,816

(22) Filed: Nov. 2, 2018

(65) Prior Publication Data

US 2019/0135183 A1    May 9, 2019

(30) Foreign Application Priority Data

Nov. 3, 2017   (DE) .................... 10 2017 125 757.8

(51) Int. Cl.
| | |
|---|---|
| *B60R 1/07* | (2006.01) |
| *B29C 44/02* | (2006.01) |
| *B60R 1/00* | (2006.01) |
| *B60R 1/06* | (2006.01) |
| *B60R 1/12* | (2006.01) |
| *B29L 31/30* | (2006.01) |
| *F16F 1/37* | (2006.01) |

(52) U.S. Cl.
CPC ............... *B60R 1/07* (2013.01); *B29C 44/02* (2013.01); *B60R 1/006* (2013.01); *B60R 1/0602* (2013.01); *B60R 1/1207* (2013.01); *B29L 2031/30* (2013.01); *B60R 2001/1223* (2013.01); *B60R 2001/1253* (2013.01); *F16F 1/37* (2013.01)

(58) Field of Classification Search
CPC ......... B60R 1/07; B60R 1/006; B60R 1/0602; B60R 1/1207; B60R 2001/1223; B60R 2001/1253; B29C 44/02; B29L 2031/30; F16F 1/37
See application file for complete search history.

(56) References Cited

U.S. PATENT DOCUMENTS

| 4,256,375 A | 3/1981 | Sharp |
| 9,079,537 B2 | 7/2015 | Niessen et al. |

FOREIGN PATENT DOCUMENTS

| EP | 1151896 A2 | 11/2001 |
| EP | 1128986 B1 | 10/2003 |

OTHER PUBLICATIONS

German Office Action dated Jul. 11, 2018 of German application No. 10 2017 125 757.8.

*Primary Examiner* — Collin X Beatty
(74) *Attorney, Agent, or Firm* — Jones Day

(57) ABSTRACT

A rear view device for a motor vehicle includes a mirror base which is mountable on the vehicle and which supports a mirror head with a housing, the mirror head being movable relative to the mirror base using at least one power-fold unit, and includes at least one support or housing element for mounting at least a part of the power-fold unit in a mounting area. The at least one element may include at least one foamed polymer part at least partly within the mounting area. A motor vehicle may include such a rear view device.

12 Claims, 2 Drawing Sheets

REAR VIEW DEVICE AND MOTOR VEHICLE

CROSS-REFERENCE TO RELATED APPLICATION

This application claims the benefit of foreign priority to German Patent Application No. DE 10 2017 125 757.8, filed Nov. 3, 2017, which is herein incorporated by reference in its entirety for all purposes.

BACKGROUND

1. Field of the Invention

The following description relates to a rear view device, in particular a rear view mirror for a motor vehicle, and to a motor vehicle with such a rear view device.

2. Related Art

Different functions and devices can be incorporated into and/or controlled with the help of rear view devices. Of particular interest are functions and devices to enhance, extend and/or sustain the functionality of the rear view device during normal or extreme conditions. This can include heating and/or cooling means, cleaning means such as wipers, liquid and/or gaseous sprays, actuator means for moving the rear view device or parts of it, such as for example a reflective element, in particular a mirror plate, a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore, it can include linear tracks and/or rotating wheels, like a filter wheel, for exchanging optical elements, including lenses, mirrors, light sources, sensors, adaptive optics like deformable mirrors and/or filters.

EP 1 128 986 B1 describes an electrically controlled mirror for a motor vehicle, provided with a support to be mounted on a vehicle for a mirror housing having a mirror plate movable in said mirror housing and actuator means in form of electromechanical means for adjusting the mirror housing relative to the support and the mirror plate relative to the mirror housing, and with any means for accommodating one or more other functions, such as mirror heating, electrochrome dimming of light falling on the mirror plate, various lighting functions, remote control means, etc. in the mirror housing, where the mirror housing includes one single build-up element on which said means are provided, in which build-up element a reinforcement element is provided for increasing the rigidity and strength of the build-up element. The build-up element forms one whole and is manufactured from a plastic, the reinforcement element being made of metal and insert-molded, in wholly or partially folded condition, in the plastic build-up element.

Further, prominent examples for functions and devices incorporated into and/or controlled with the help of rear view devices include illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further, examples for functions and devices incorporated into and/or controlled with the help of rear view devices can include for example a tiredness detection system, a micro-sleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device can include a plurality of different optical elements including a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. DE 102016108247. Further, the camera can include for example CCD or CMOS or light field sensors, as for example described in German patent application No. DE 102011053999. Also an area of the sensor can be reserved for different purposes, for example to detect a test beam, as described in U.S. Pat. No. 8,031,224, which is hereby incorporated by reference in its entirety for all purposes. The camera module can also be equipped with apparatuses for light intensity adjustment as described for example in U.S. patent application Ser. No. 14/809,509, which is hereby incorporated by reference in its entirety for all purposes, and light level intensifier tubes as described in U.S. patent application Ser. No. 09/771,140, which is hereby incorporated by reference in its entirety for all purposes. Still further, the camera module or a cover adapted to the camera module can be moved using different actuators, drives and/or a flexible track, as for example described in German application No. 102016108247.3.

The camera module can also include cleaning elements to clean the optical element facing outwards and being exposed to the environment. The cleaning element can for example include wipers, brushes, lips, nozzles, fans and similar elements as are described in European patent application No. 14165197.6, European patent application No. 13163677.1, and European patent No. 1673260 corresponding to U.S. patent application No. 2007/273971, each of which is hereby incorporated by reference in its entirety for all purposes. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224, each of which is hereby incorporated by reference in its entirety for all purposes. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140, each of which is hereby incorporated by reference in its entirety for all purposes.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, each of which is hereby incorporated by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated by reference in its entirety for all purposes. Alternatively, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in U.S. Pat. No. 8,979,288, which is hereby incorporated by reference in its entirety for all purposes.

Thus, rear view devices are widely known from the prior art, in particular in the form of rear view mirrors. They generally include a base, which is affixed to a vehicle, and a head which carries at least a mirror glass and/or a camera and often additional elements such as side turn indicators or the like. The head is usually mounted pivotally movable with respect to the base. This allows the head to move out of the way in case of a minor collision, thereby preventing damage to the head or injury to pedestrians who get hit by the rear view device. Furthermore, the head can be pivoted, either manually or by means of an automatic folding system, from an operating position, in which the rear view device enables the driver of the vehicle to receive a view in particular to the back, to a parking position, in which the head is folded against the side of the vehicle. This reduces the lateral extent of the vehicle with the mirror in the parking position and prevents accidental damage to the mirror of a parked vehicle.

Shape memory alloys (SMA) are used for various functions with rear view devices. US patent application No. 2016/347252, which is hereby incorporated by reference in its entirety for all purposes, relates to an actuator device for a rear view device of a motor vehicle including: at least one retaining element; at least one adjusting element which can be transferred into a plurality of functional positions, in particular from a parking position into at least one operating position; at least one driving means which includes at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the parking position into the operating position or vice versa; at least one heat-conducting means which lies in contact with the driving means at least in the end position of the adjusting element; and wherein at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which includes at least one shape-memory element which can be fixed or is fixed to the drum body and with which the drum body can be moved in a first rotational direction, and at least one return means which includes at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

As already mentioned, rear view devices for motor vehicles are usually foldable between an operational position, in which they allow a driver of the vehicle a rear view at the surrounding traffic, and a folded position, in which they are folded against a side body part of the vehicle. The folded position is for example used when the vehicle is parked in order to reduce the space demand of the vehicle and to avoid damage to the rear view devices from passing traffic.

In many modern cars, the folding motion of the rear view devices is automated, for example by means of electrical motors. Such motors cause noise and vibration during their operation, which is generally undesirable.

WO 2000/0460702 describes an external mirror assembly for a vehicle. A mirror housing of the assembly includes an external plastic shell which contains a load diffusing element and is filled with polymer foam. Such foams can act as dampeners for noise and vibrations. However, large polymer foam bodies take up significant space within the mirror assembly. Due to the increased need for integration of additional components, such as lighting modules, sensors, display modules and the like, into rear view devices, the available space has to be used as efficiently as possible.

SUMMARY

In one aspect, a rear view device for a motor vehicle includes a mirror base, which is mountable on the vehicle and which supports a mirror head with a housing, the mirror head being movable relative to the mirror base by means of at least one power-fold unit, and includes at least one support and/or housing element for mounting at least a part of the power-fold unit in a mounting area, wherein the at least one element includes at least one foamed polymer part at least partly within the mounting area.

The at least one support and/or housing element can be included by a support plate providing the mounting area for the power-fold unit. The mounting area can be provided by a first receptable for a motor part of the power-fold unit and/or second receptable for a transmission or gear part of the power-fold unit, with preferably the first and/or second receptable including at least one first foamed polymer part, in particular provided by or connected to a wall portion.

The power-fold unit may include a first housing part of the motor part and/or a second housing part of the transmission or gear part, with preferably the first and/or second housing part including at least one second foamed polymer part.

The rear view device may further include at least one reinforcement element for reinforcing the at least one support and/or housing element, in particular in the region of the at least one foamed polymer part. The at least one reinforcement element can provide a frame within or around the mounting area, and/or the reinforcement element can include a metal and/or a high-strength polymer.

Each foamed polymer element may include a physically and/or chemically foamed polymer.

The thickness of the support and/or housing element may be larger in the mounting area than in the remaining area.

The support and/or housing element can include at least one further mounting area for at least one further mirror component, which at least one further mirror component including a mirror glass actuator, an electronic control circuit, a heating element, a lighting module, in particular a turn signal indicator, a logo light or a puddle light, a sensor, in particular a camera, a radar sensor or an ultrasound sensor, a reflective element and/or a display module.

A rear view device, in particular an electrically controlled mirror, for a motor vehicle, includes a mirror base which is mountable on the vehicle and which supports a mirror head with a housing, the mirror head being movable relative to the mirror base by means of at least one electromechanical actuator, wherein the mirror housing includes a support plate with a mounting area for mounting the at least one electromechanical actuator, and wherein the support plate includes at least one foamed polymer part providing at least part of the mounting area.

The foamed polymer part of the support plate provides a dampening effect against sound and vibration. By integrating it into the support plate, a particularly compact arrangement is provided which leaves spaces for other components.

The foamed polymer part may be an integrally formed portion of the support plate, for example forming the remainder of the support plate around the foamed polymer part via injection molding. The foamed polymer part can be provided as a separate part which is fixed to the support plate by fixing means such as screws, adhesive, clip connectors or the like.

The rear view device includes at least one reinforcement element for reinforcing the support plate. Such a reinforcement element lends additional stability to the support plate and compensates for mechanical weaknesses of the foamed polymer.

The at least one reinforcement element may form a frame within or around the mounting area. In this manner, the support plate may be reinforced and stabilized in an area that experiences the highest mechanical forces during the folding operation, providing a particularly stable and vibration-free rear view device.

The reinforcement element may include metal and/or a high-strength polymer. This efficiently gives additional support and strength to the support plate. The reinforcement element can further be constructed from a combination of the above-mentioned materials. Still further a metal portion of the reinforcement element can also be used as an electrical conductor, for example to provide the actuator with energy or with control signals.

The foamed polymer element may include a physically foamed polymer. Physically foamed polymers are formed by injecting an inert gas, such as nitrogen or carbon dioxide, into a polymer mass, for example during injection molding. It is thus possible to provide foamed polymers with a high variability of matrix materials, which can be easily adapted for specific constructive needs.

The foamed polymer element may include a chemically foamed polymer. In the case of chemically foamed polymers, the gas for foaming is provided by a chemical foaming agent mixed into the polymer mass. While this limits the selection of possible polymer matrix materials, the chemical foaming process is simpler, since no special gas injection means have to be provided. For this reason, such foamed polymer elements are particularly cheap to produce.

A thickness of the support plate in the mounting area is larger than in at least one neighboring area to the support plate. The increase in thickness improves the noise absorption and vibration damping capacity of the support plate in the mounting area, thus providing a particularly quiet and vibration-free rear view device.

The support plate may include at least one further mounting area for at least one further mirror component. By using a multifunctional support plate, the need for additional support or mounting structures within the mirror head is reduced, which saves space and weight and leads to a particularly compact rear view device.

The at least one further mirror component may include a mirror glass actuator, an electronic control circuit, a heating element, a lighting module, in particular a turn signal indicator, a logo light or a puddle light, a sensor, in particular a camera, a radar sensor or an ultrasound sensor, a reflective element, and/or a display module. Such components can provide a multitude of functions, which improve the usability of the rear view device as well as the traffic safety of the vehicle.

In another aspect, a motor vehicle includes a rear view device as described above.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

The term "rear view" is here defined as a view of the surrounding area, which is not in the field of view of a driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

Figure 1:
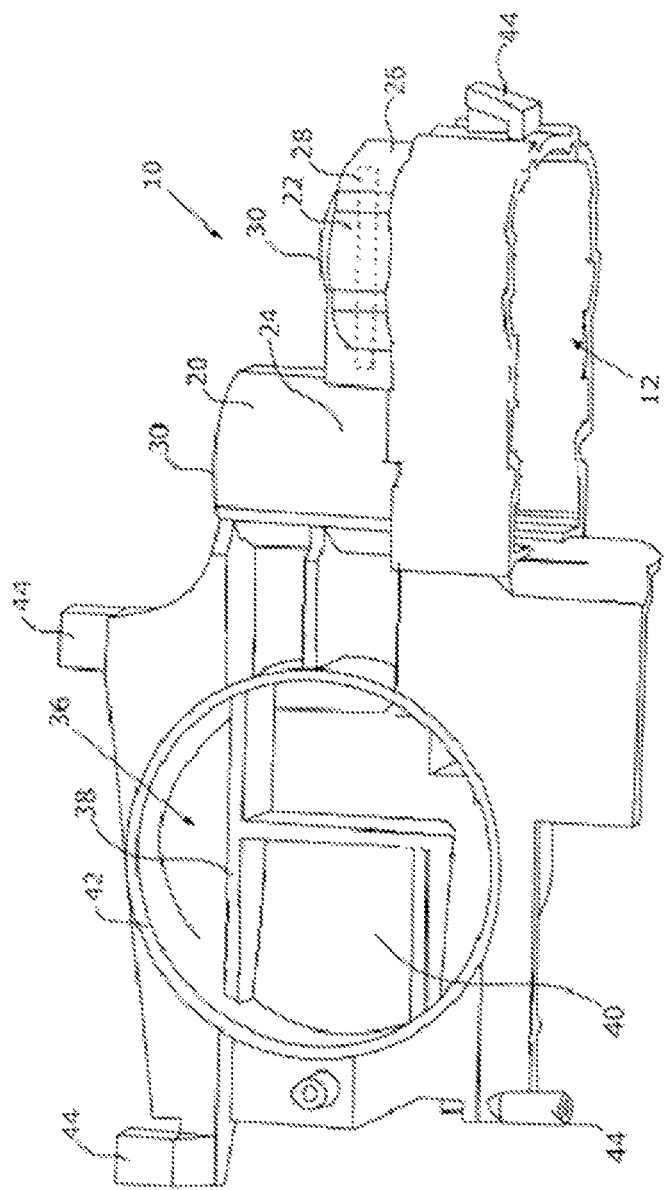
FIG. 1 is a schematic representation of a support plate for an example of a rear view device.
Figure 2:
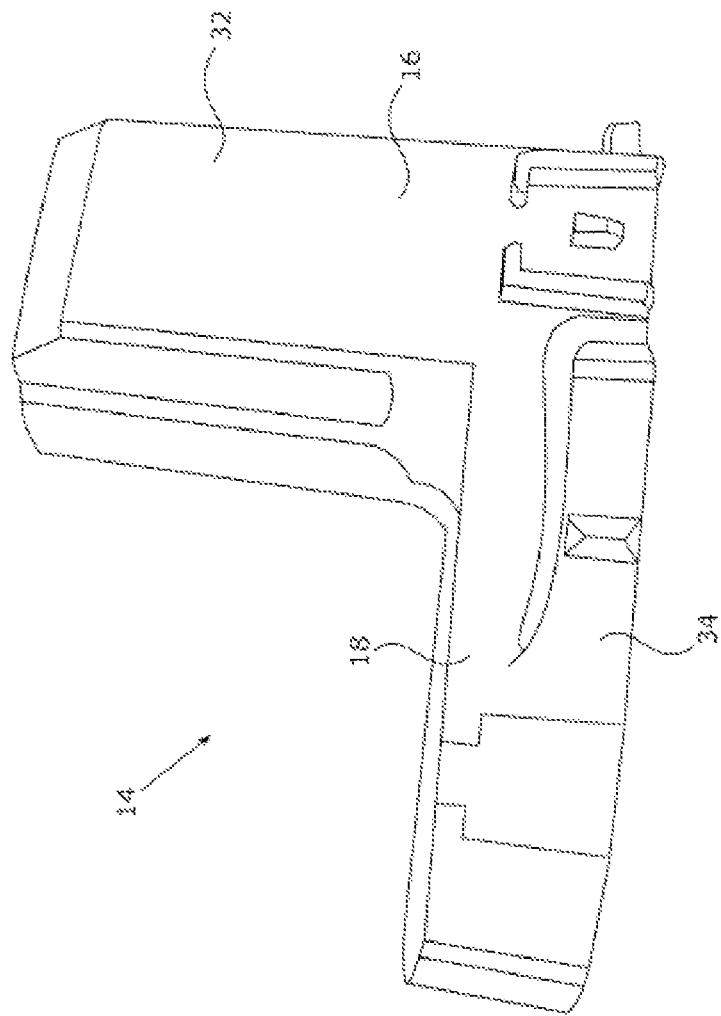
FIG. 2 is a schematic representation of an electromechanical power-fold unit to be attached to the support plate of FIG. 2.

A support plate 10 for components of a rear view mirror is shown in FIG. 1. It includes a mounting area 12 for an electromechanical power-fold unit 14, which is depicted in FIG. 2. The power-fold unit 14 includes a motor part 16 and a transmission part 18 with gear elements, with both the motor part 16 and the transmission part 18 being supported by corresponding receptacles 20, 22 of the mounting area 12. Together, the motor part 16 and the transmission part 18 of the power-fold unit 14 can be employed to move a mirror head of the rear view mirror relative to a mirror base, in order to fold the rear view mirror or better its head from its operational position into a parking position.

In order to reduce the noise and vibration caused by the operation of the power-fold unit 14, the mounting area 12 of the support plate 10 may be at least partially formed from chemically or physically foamed polymers. For example, wall portions 24, 26 of the receptacles 20, 22 can contain such polymers in order to increase the absorption of noise and vibrations. Preferably, such foamed polymers are provided as close-cell foams for a particularly high dampening efficiency. Suitable foamig agents are well known in the art, in particular in form of Luvobatch®.

In order to improve the mechanical stability of the support plate 10, it is well known to arrange reinforcement elements 28 within and/or around the mounting area 12. Such reinforcement elements 28 can be made from metals, such as steel or zinc or zinc-based die casting alloys, or from high-strength polymers.

A bottom part 30 of the mounting area 12 may have an increased thickness compared to neighboring parts of the support plate 10. This helps to give the support plate 10 the necessary mechanical durability as well as a particularly good noise and vibration dampening characteristic.

The power-fold unit 14 can also be provided with noise dampening materials. For example, an upper housing part 32 for the motor part 16 can be formed from foamed polymer, while a lower housing part 34 can be formed from a metal or a high-strength polymer to ensure the mechanical stability of the transmission part 18.

The support plate 10 may include further mounting areas in order to provide a high functional integration and thus a compact rear view mirror. For example, FIG. 1 shows a circular mounting area 36 which can receive an actuator for a mirror glass of the rear view mirror. The mounting area 36 also includes a reinforcement elements 38 to ensure mechanical stability.

It is further possible to also form at least parts of the bottom 40 or the enclosing wall 42 of the mounting area 36 with noise dampening materials like foamed polymers. Further mounting areas, which are not shown in the exemplary embodiment, can be used for mirror heating devices, lighting modules, display modules, sensors or the like.

The support plate 10 can be produced by injection molding. The supporting elements 28, 38 can be integrated into the support plate by arranging them as inserts within an injection molding tool and forming the remaining structures of the support plate 10 around them. This is also possible for the foamed polymer parts. Alternatively, the latter can be formed in situ in a two-component molding process or provided as separate parts which can be fixed to the support plate 10 by screws, adhesives, clips or the like.

In order to mount the support plate 10 within a mirror housing of the rear view mirror, mounting clips 44 are arranged on its outer boundaries. These allow for an easy installation and removal of the support plate 10.

While the rear view device has been described in terms of a rear view mirror to illustrate the above examples, it is also possible to use a support plate 10 of the described nature in other rear view devices, such as rear view cameras or mirror-camera-combinations.

According to various aspects, a rear view device with a support plate 10 is extremely compact due to the high functional integration of the support plate 10 while being particularly well shielded against noise and vibration.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGN LIST 10 support plate
12 mounting area
14 power-fold unit
16 motor part
18 transmission part
20 receptacle
22 receptacle
24 side wall portion
26 side wall portion
28 reinforcement element
30 bottom wall partie
32 upper housing part
34 lower housing part
36 mounting area
38 reinforcement element
40 bottom
42 wall
44 mounting clip

What is claimed is:

1. A rear view device for a motor vehicle, comprising:
a mirror base which is mountable on the motor vehicle and which supports a mirror head with a housing, the mirror head being movable relative to the mirror base using at least one power-fold unit; and
a support plate providing a mounting area for the power-fold unit for mounting at least a part of the power-fold unit in the mounting area,
wherein, at least one of:
the mounting area is provided by at least one of a first receptacle for a motor part of the power-fold unit and a second receptacle for a transmission or gear part of the power-fold unit, with the at least one of the first receptacle and the second receptacle comprising at least one first foamed polymer part, and
the power-fold unit comprises at least one of a first housing part of the motor part of the power-fold unit and a second housing part of the transmission or gear part of the power-fold unit, with the at least one of the first housing part and the second housing part comprising at least one second foamed polymer part.

2. The rear view device according to claim 1, wherein the at least one first foamed polymer part is provided by or connected to a wall portion.

3. The rear view device according to claim 1, further comprising at least one reinforcement element for reinforcing at least one of a support element and a housing element.

4. The rear view device according to claim 3, wherein the reinforcement element beings in the region of the at least one foamed polymer part.

5. The rear view device according to claim 3, wherein the at least one reinforcement element provides a frame within or around the mounting area.

6. The rear view device according to claim 3, wherein the reinforcement element comprises at least one of a metal and a high-strength polymer.

7. The rear view device according to claim 1, wherein each foamed polymer element comprises at least one of a physically and a chemically foamed polymer.

8. The rear view device according to claim 1, wherein a thickness of at least one of a support element and a housing element is larger in the mounting area than in a remaining area.

9. The rear view device according claim 1, wherein at least one of a support and a housing element comprises at least one further mounting area for at least one further mirror component, the at least one further mirror component comprising at least one of a mirror glass actuator, an electronic control circuit, a heating element, a lighting module, a sensor, a reflective element, and a display module.

10. The rear view device according to claim 9, wherein, at least one of:
the at least one further mirror component comprises the lighting module, and the lighting module is a turn signal indicator, a logo light, or a puddle light, and
the at least one further mirror component comprises the sensor, and the sensor is a camera, a radar sensor, or an ultrasound sensor.

11. A motor vehicle with a rear view device according to claim 1.

12. A rear view device for a motor vehicle, comprising:
a mirror base which is mountable on the motor vehicle and which supports a mirror head with a housing, the mirror head being movable relative to the mirror base using at least one power-fold unit; and
a support plate providing a mounting area for the power-fold unit for mounting at least a part of the power-fold unit in the mounting area,
wherein, at least one of:
the mounting area is provided by at least one of a first receptacle for a motor part of the power-fold unit and a second receptacle for a transmission or gear part of the power-fold unit, with the at least one of the first receptacle and the second receptacle comprising at least one first foamed polymer part, and
the power-fold unit comprises at least one of a first housing part of the motor part of the power-fold unit and a second housing part of the transmission or gear part of the power-fold unit, with the at least one of the first housing part and the second housing part comprising at least one second foamed polymer part, and
wherein at least one a support and a housing element comprises at least one further mounting area for at least one further mirror component, the at least one further mirror component comprising at least one of a mirror glass actuator, an electronic control circuit, a heating element, a lighting module, a sensor, a reflective element, and a display module.

* * * * *